United States Patent [19]
Richmond et al.

[11] Patent Number: 5,889,338
[45] Date of Patent: Mar. 30, 1999

[54] DEMAGNETIZING APPARATUS FOR AN AUTOMOTIVE ENGINE

[76] Inventors: Tom A. Richmond, 7419 Altama Rd., Jacksonville, Fla. 32216; Dolores A. Hagerty, 828 Lyndon Ave., Ashtabula, Ohio 44004

[21] Appl. No.: 871,117

[22] Filed: Jun. 9, 1997

[51] Int. Cl.$^6$ ..................................................... H01F 13/00
[52] U.S. Cl. .......................................... 307/10.1; 361/267
[58] Field of Search .............................. 307/89–91, 101, 307/10.1, 9.1; 701/224; 361/143, 149, 159, 267; 335/284; 123/195 R, 195 E

[56] References Cited

U.S. PATENT DOCUMENTS

| | | |
|---|---|---|
| 1,424,140 | 7/1922 | Replogle . |
| 4,074,670 | 2/1978 | Roberts et al. . |
| 4,158,346 | 6/1979 | Roberts et al. . |
| 4,213,428 | 7/1980 | Bradley . |
| 4,378,581 | 3/1983 | Kuno et al. . |
| 4,388,666 | 6/1983 | Kuno et al. . |
| 4,665,870 | 5/1987 | Cerini et al. .................. 123/195 R |
| 4,856,482 | 8/1989 | Linder et al. . |
| 4,867,108 | 9/1989 | Forde . |
| 4,887,184 | 12/1989 | Armond . |
| 5,737,226 | 4/1998 | Olson et al. ............................. 701/284 |

*Primary Examiner*—Richard T. Elms
*Attorney, Agent, or Firm*—Joseph H. Taddeo

[57] ABSTRACT

An automotive internal combustion engine demagnetizer that can improve engine performance by reducing the magnetic drag associated with the operation of the engine. By demagnetizing the engine block while the engine is running contributes to improved efficiency and performance. The demagnetizer is designed to be retrofitted onto a standard automobile having a conventional engine. A high current short duration repetitive rectangular pulse passing through the engine block serves to demagnetize it. It also allows metal particles both large and micro in size to stick to the engine block and other moving parts. This collection of particles contributes to engine failure and to the ultimate life of the engine. When the engine is not running, the present invention eliminates or reduces all magnetism in the engine block, causing almost all metal particles to fall into the crankcase that contains the oil. When the oil is drained, these particles are removed and discarded with the oil.

12 Claims, 4 Drawing Sheets

DEMAGNETIZING APPARATUS FOR AN AUTOMOTIVE ENGINE

FIELD OF INVENTION

The present invention relates to an apparatus that can be used to demagnetize an automotive engine while running, and more particularly to an apparatus that can improve engine performance by reducing the magnetic drag associated with the operation of an internal combustion engine.

BACKGROUND OF THE INVENTION

The process of removing the permanent magnetization of a ferromagnetic object, so that the residual flux density is zero, under conditions of a zero H field is called demagnetization or deperming.

There are two principle methods that may be used in demagnetizing ferromagnetic objects. They are: (1) the application of a negative coercive force to the object being demagnetized and (2) demagnetization by reversals.

In the first method, the magnetic flux density B can be reduced to zero by the application a coercive force $H_c$. However, upon removing this field, the residual flux density will rise to some value greater than zero. Although it may be possible to completely demagnetize the object by increasing H slightly more than the coercive force, this process requires an accurate determination of B and H and the hysteresis loop.

The second and more popular method of demagnetizing is called demagnetization or deperming by reversals. In this method, on each reversal, H is brought to a smaller maximum amplitude, so that the object is eventually left in a state of complete demagnetization.

Although such a demagnetization procedure can be completely carried out in a matter of seconds with small objects, several minutes may be required for each reversal for large objects because of the slow decay of the induced eddy currents and the reluctance of the domains to change polarity.

U.S. Pat. No. 4,867,108, granted Sep. 19, 1989, to L. L. Forde, et al, teaches of an electrostatic power system for increasing the performance of an internal combustion engine.

U.S. Pat. No. 4,856,482, granted Aug. 15, 1989, to E. Linder, et al, discloses a method of controlling the demagnetizing phase of electromagnetic devices, particularly of electromagnetic valves in internal combustion engines.

U.S. Pat. No. 4,388,666, granted Jun. 14, 1983, to A. Kuno, et al, discloses a demagnetizer for removing the residual magnetism in an entire stationary automotive vehicle.

U.S. Pat. No. 4,378,581, granted Mar. 29, 1983, to A. Kuno, discloses demagnetizing apparatus for removing the residual magnetism in the body of an automobile. Its purpose is to remove the magnetic field distortion in a bearing indicator.

U.S. Pat. No. 4,213,428, granted Jul. 22, 1980, to P. Bradley, discloses electromagnetic augmentation for an internal combustion engine to increase the engine efficiency by magnetically guiding the piston. Magnetic forces are used to attract and repel the piston in synchronization with its normal motion.

U.S. Pat. No. 4,158,346, granted Jun. 19, 1979, to C. G. Roberts, et al, teaches of an apparatus to improve the automotive efficiency of an internal combustion engine by using a set of inductive coils connected to the battery terminal of the vehicle U.S. Pat. No. 4,074,670, granted Feb. 21, 1978, to C. G. Roberts, et al, discloses apparatus for improving the efficiency of an automotive vehicle by using a pair of closely adjacent electrically conductive coils.

U.S. Pat. No. 1,424,140, granted Jul. 25, 1922, to J. B. Replogle, discloses a magnetic throttle positioner that minimizes the effect of hysteresis to maintain accurate throttle positioning.

Several of the referenced prior art disclose methods and apparatus for demagnetizing an entire vehicle, while others disclose demagnetization of various components within the structure of an automotive vehicle. Also, some of the above referenced prior art disclose methods of demagnetizing automotive accessories to improve engine performance.

Therefore, there is a particular need for a demagnetization system as applied to an internal combustion engine of an automotive vehicle to reduce or minimize engine drag, which when implemented, can result in improved engine efficiency and performance.

SUMMARY OF THE INVENTION

The present invention is directed to apparatus for demagnetizing an automotive internal combustion engine while it is running, to improve engine performance and efficiency by reducing the magnetic drag associated with the operation of the engine. It is designed to be retrofitted onto a standard automobile having a conventional engine.

All steel engines develop magnetism as they run. This magnetic force causes a certain amount of drag in engine performance. It also allows metal particles both large and micro in size to stick to the engine block and other moving parts. This collection of particles can contribute to engine failure and to the ultimate life of the engine.

The present invention is a device that reduces the magnetism in an automotive internal combustion engine while it is running, thereby improving the all around engine efficiency and performance.

To reduce or minimize the magnetism in an internal combustion engine, a 20 ampere pulse, that is 80 millisecond in duration, is applied repetitively at a pulse repetition rate of 5 seconds to effectively demagnetize the engine. To be effective, the current must first flow through the engine block by attaching the units large black lead to the opposite end of the engine block. The conductive path is completed by the battery cable that connects the negative battery post to the engine block.

The effect of magnetism in the engine causes metal particles to clump and adhere to each other. When an engine is not running, the present invention eliminates all magnetism in the engine block, causing almost all metal particles to fall into the crankcase containing the oil. When the crankcase is drained, these particles are discarded along with the spent oil.

Automobiles that were tested with the present invention demonstrated a 3 to 4% increase in gas mileage although the device is not fuel related in any manner.

It is therefore an object of the present invention to provide a demagnetization system for an automotive internal combustion engine by applying a short rectangular high current pulse through the engine block.

It is another object of the present invention to provide a demagnetization system for an automotive internal combustion engine by applying a short rectangular high current pulse through the engine block, that when applied, improves the engine efficiency and performance.

It is still another object of the present invention to provide a demagnetization system for an automotive internal combustion engine that can be retrofitted onto an existing automobile.

These and other advantages of the present invention will become more apparent upon further reading of the detailed specification. It should be understood that deviations or modifications can be made without deviating or departing from the spirit of the present invention.

DETAILED DESCRIPTION OF THE PREFERRED EMBODIMENT

The present invention details a demagnetizing device that can be used to demagnetize an automotive engine while it is running. When properly installed, this invention can improve engine performance by reducing the magnetic drag associated with the operation of the internal combustion engine.

The process of removing the permanent magnetization of a ferromagnetic object, so that the residual flux density is zero, under conditions of a zero H field is called demagnetization or deperming.

Figure 1:
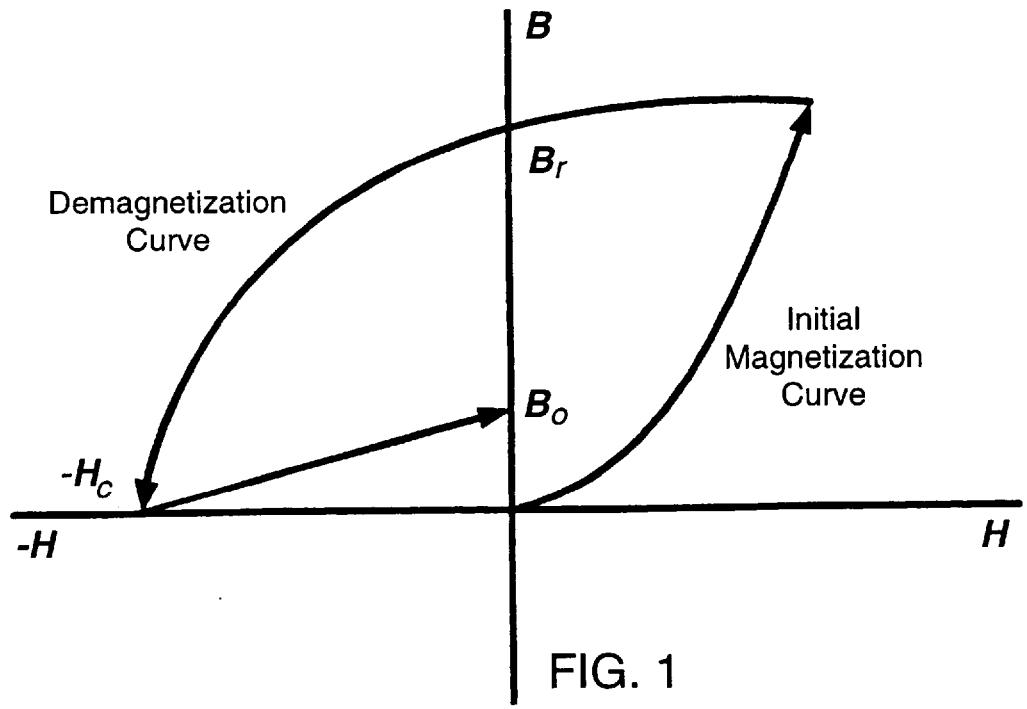
FIG. 1, depicts a graph showing a partial hysteresis loop that illustrates the effect of demagnetization by application of a negative coercive force.
Figure 2:
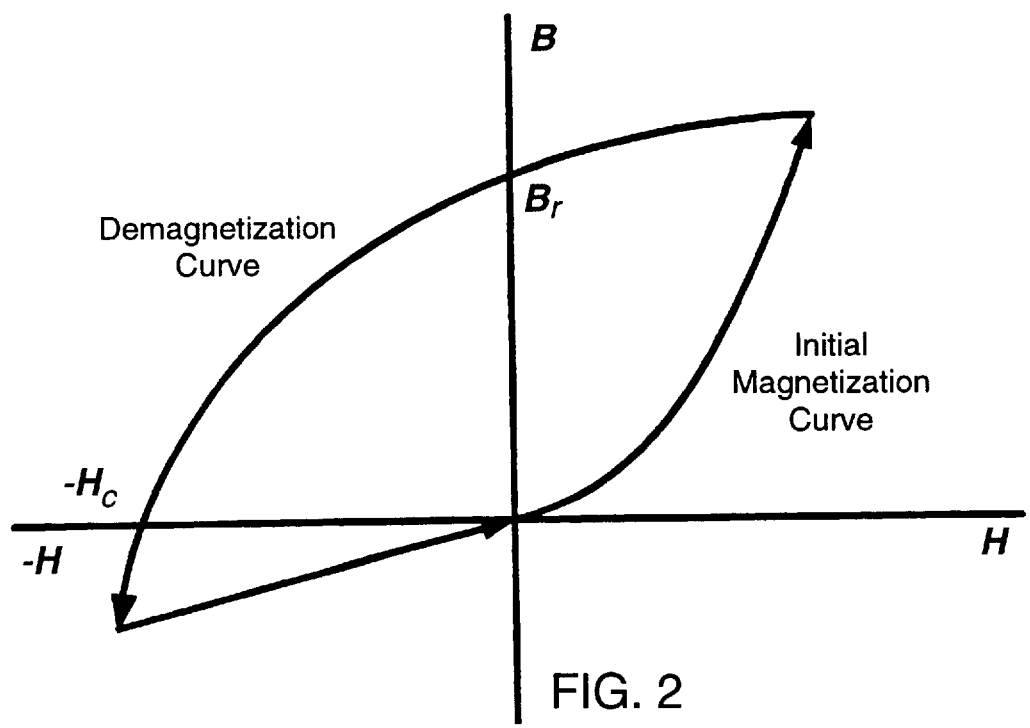
FIG. 2 depicts a graph showing a partial hysteresis loop that illustrates the effect of reducing the magnetization to zero by increasing the negative coercive force.

It is evident that B can be reduced to zero by the application a coercive force $H_c$, but upon removing this field, the residual flux density will rise to some value $B_0$ as suggested in FIG. 1. Although it may be possible to end up at B=0 and H=0 by increasing H slightly more than the coercive force $H_c$ and decreasing B to zero as shown in FIG. 2, the process requires an accurate knowledge of B and H and the hysteresis loop.

A longer but more simply applied method is called demagnetization or deperming by reversals. In this method, H is brought to a smaller maximum amplitude on each reversal so that eventually the object is left in a demagnetized state.

Figure 3:
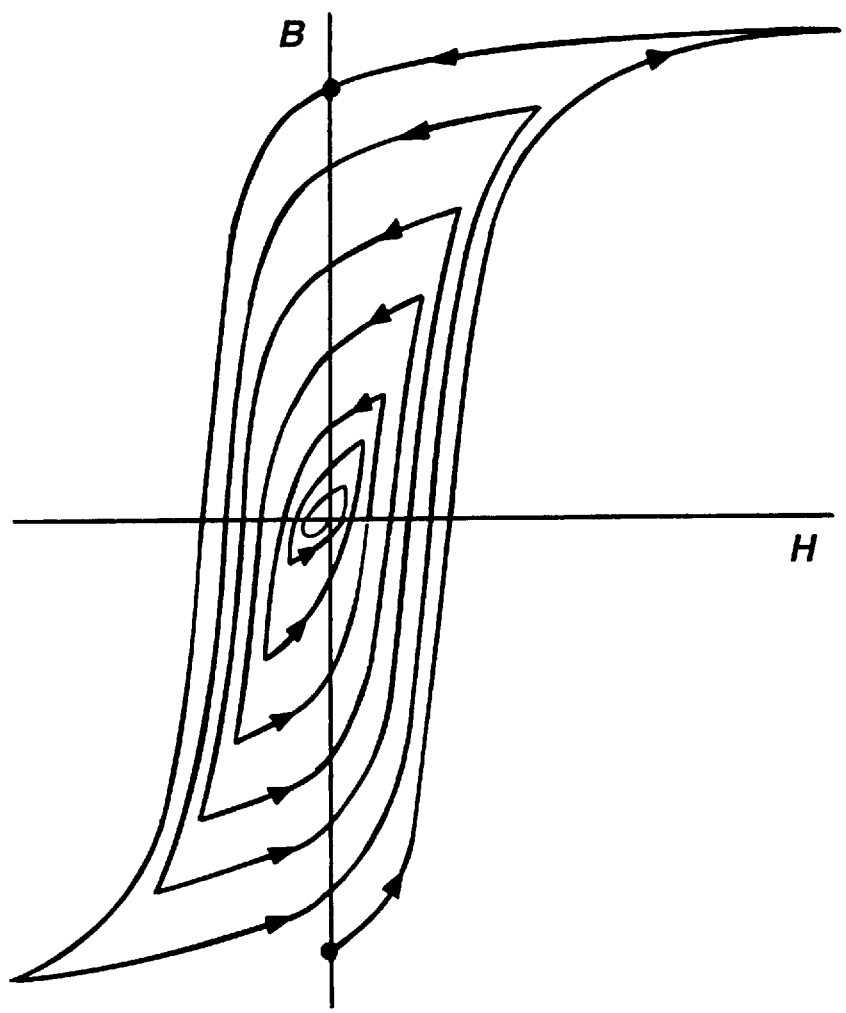
FIG. 3 depicts a graph of a typical B-H curve illustrating the method of demagnetization by reversals.

Although such a demagnetization procedure can be completely carried out in a matter of seconds with a small object such as a watch, many seconds or even minutes may be required for each reversal for large magnetic objects because of the slow decay of the induced eddy currents and the reluctance of the domains to change polarity. This demagnetization procedure is shown in FIG. 3.

The present invention will now be described in detail in accordance with the referenced drawings.

Figure 4:
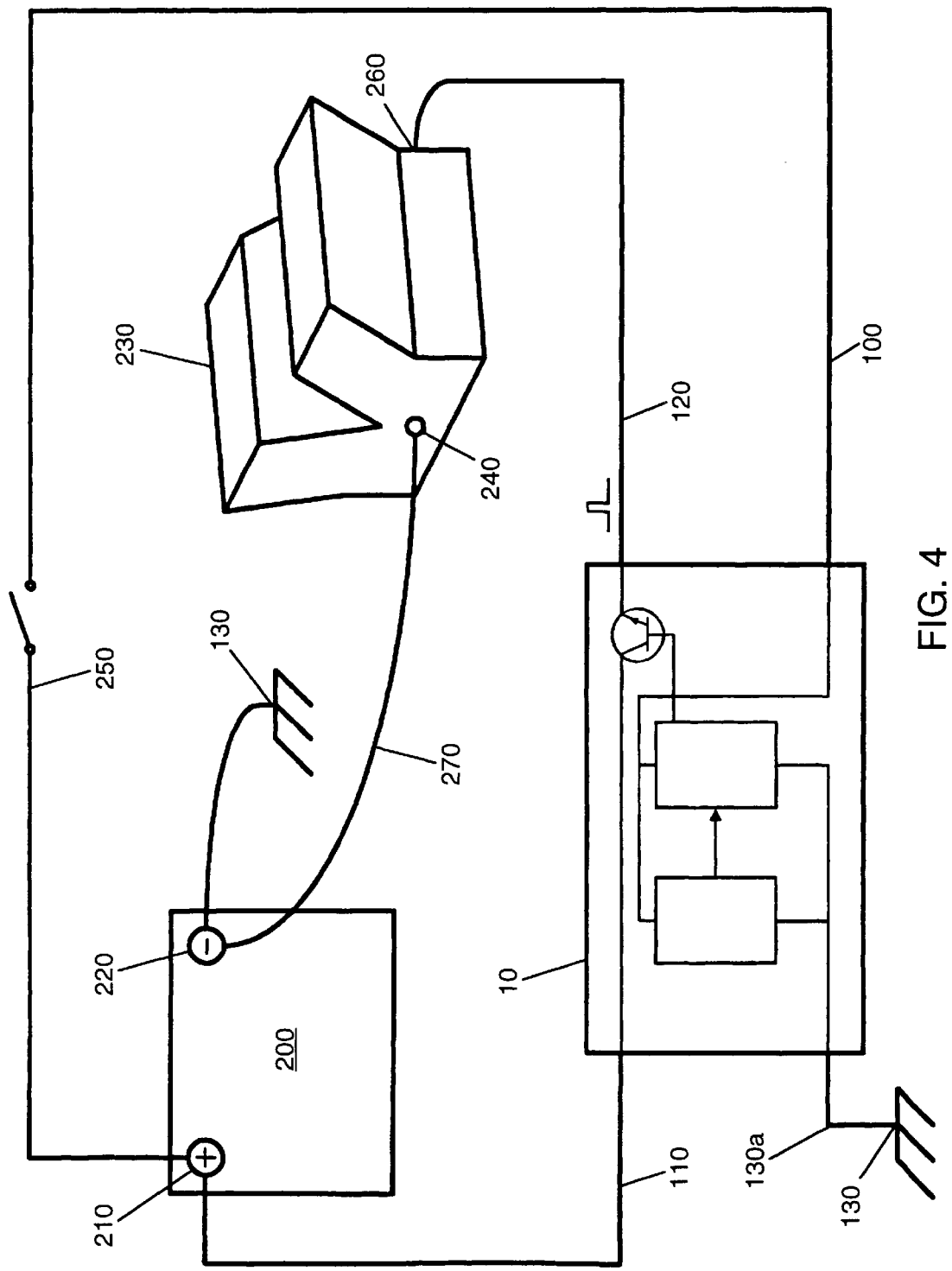
FIG. 4 is a block diagram of the system showing the interconnection of the demagnetizing device to the existing engine block and its associated battery.

Turning now to FIG. 4, shown is a battery 200, that is typically found in an automotive vehicle. The negative battery post 220 connects to the frame of the automobile at connection point 130. The positive battery post 210 connects the demagnetizing device 10 through a large gauge red wire 110, that will suitably carry a heavy current pulse. The smaller gauge black wire 130a connects to any convenient point of attachment 130 of the frame of the automobile.

Also connected to the positive battery post 210 is the existing ignition switch 250. The green lead 100 of the demagnetizing device 10 is attached to a +12 v source that is ignition switched by ignition switch 250, such that the unit will only operate when the vehicle ignition is on. Otherwise the unit may deplete the battery.

The present invention typically uses a 20 ampere rectangular pulse, 80 milliseconds in duration, that is applied repetitively at a pulse repetition rate of 5 seconds to effectively demagnetize the engine while it is running. To be effective, the current must first flow through the engine block 230 by attaching the large black lead 120 of the device to the engine block end 260, that is opposite the battery cable connection 240. This battery cable 270, that connects the negative battery post 220 to the engine block at connection point 240, completes the pulse's conductive path.

Figure 5:
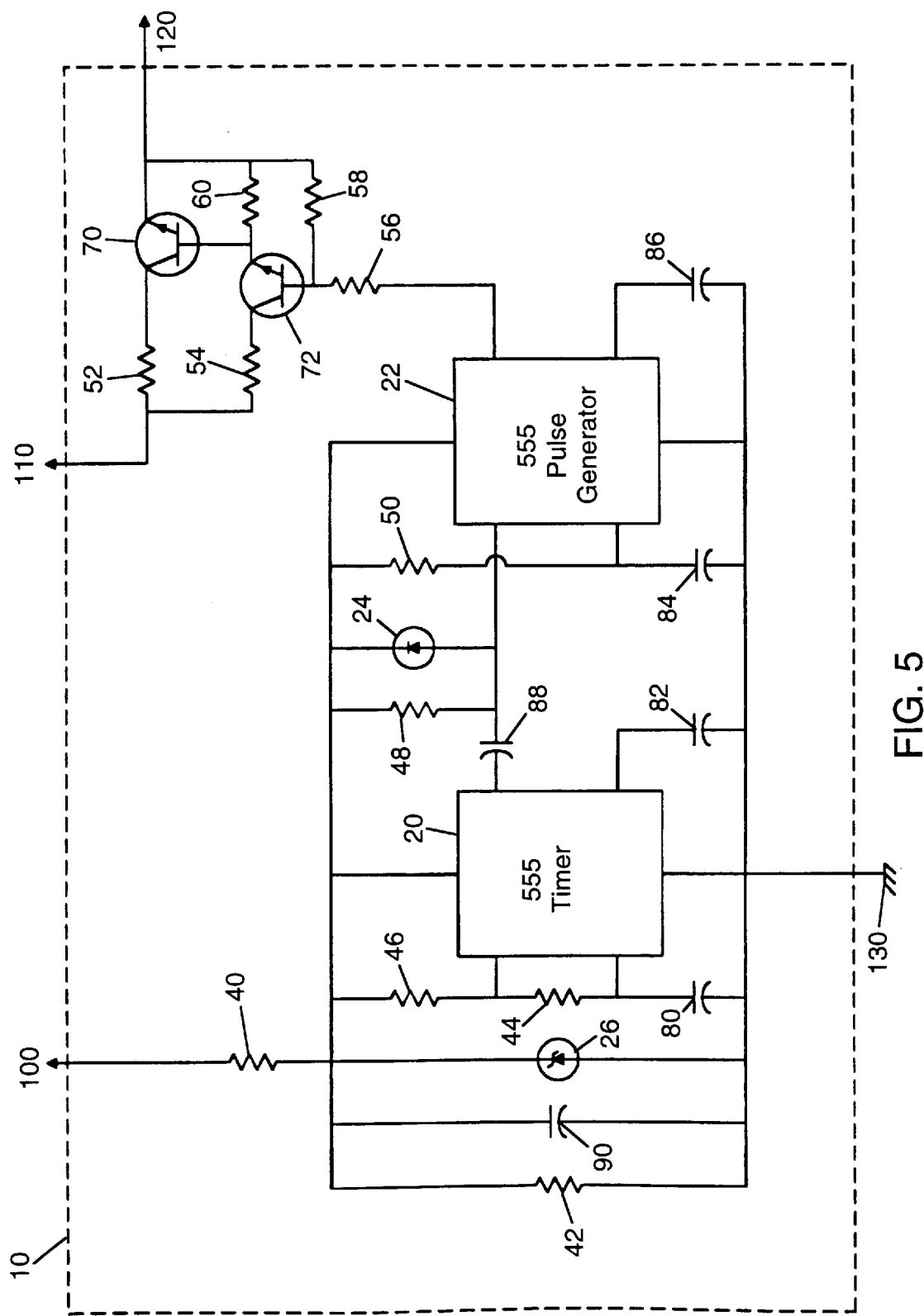
FIG. 5 is a detailed schematic diagram of the automotive engine demagnetizing device.

As schematically shown in FIG. 5, the voltage source for the demagnetizing device 10 is obtained via wire 100. Resistor 40 limits the current flowing through it, by providing a suitable operating point for Zener diode 26. Connected in parallel with Zener diode 26 is capacitor 90 and resistor 42. Also connected to the Zener diode regulated source is timer 20 and pulse generator 22. Both timer 20 and pulse generator 22 are preferably NE555 semiconductor devices.

Resistors 44 and 46, and capacitors 80 and 82 coact with timer 20 to produce a pulse repetition rate that is preferably a rate of 5 seconds. The output of timer 20 is capacitively coupled to pulse generator 22 by way of capacitor 88. Resistors 48 and 50, together with capacitors 84 and 86, and diode 24 coact with semiconductor device 22 to produce a rectangular pulse, that is preferably 80 milliseconds in duration.

The output of the pulse generator 22 connected to the output devices 70 and 72 via resistor 56. NPN semiconductor device 72 and resistors 54, 58 and 60 comprise a follower to provide sufficient current to drive the final output NPN transistor 70. The high current source is provided by way of conductor 110 through protective current limiting resistor 52 to the collector of NPN transistor 70. The final pulsed output appears at the emitter of transistor 70 and connects to the engine block through wire 120.

The following procedure can be used installing this device onto an existing automotive engine.

1). To be effective, the current must first flow through the engine block 230. This is accomplished by locating the connection 240 that is made from the negative battery post terminal 220 to the engine block. The devices large black lead 120 is then attached to the opposite end of the engine block at connection point 260.

2). The devices large red lead 110 is attached to either the positive battery post or any other source of 12 volts that can handle the heavy pulsed current.

3). The green lead 100 is attached to an ignition switched source of 12 volts, such that the device will only operate when the vehicle's ignition is turned on. Otherwise the unit may deplete the battery.

4). Finally, the device's small black lead 130a is connected to any convenient vehicle ground point of attachment 130.

5). This completes the installation of the automotive engine demagnetizing device.

While specific embodiments of the present invention have been shown and described in detail to illustrate the principles of the invention, it should be understood the that other modifications or embellishments can be made without departing from the true spirit of the invention.

We claim:

1. An apparatus having a circuit for demagnetizing an automotive engine while in operation, to improve engine performance and efficiency by reducing the magnetic drag of the engine in vehicles having a battery with positive and negative battery posts, a vehicle frame with a frame connection point, an ignition switch to start engine operation, the apparatus comprising:

an apparatus input connected to the battery positive post;

an apparatus output connected to one side of the engine;

a cable for connection between an opposite side of the engine to the battery negative post and further to the connection point of the vehicle frame;

a means for generating a current pulse communicating with the input for output by the apparatus to deperm the engine by reversals, whereby the engine is demagnetized by successive current pulses therethrough.

2. The apparatus according to claim 1, wherein the battery positive post is connected to the demagnetizing apparatus through the ignition switch, such that the apparatus operates only when the vehicle ignition is on.

3. The apparatus described in claim 2, wherein the means for generating provides a rectangular current pulse to the engine; and, further comprising a timer means on the circuit parallel with the means for generating, for timing duration of the pulse and a rate of pulse repetition to repetitively apply the pulse through the engine and effectively demagnetize the engine while it is running.

4. The apparatus of claim 3, wherein the timer means comprises a timer assembly with a Zener diode, connected to the battery through a current limiting resistor, in parallel to a timer with a semiconductor, the assembly including a capacitor and series resistors which coact with the timer to produce a predetermined pulse repetition rate.

5. The apparatus of claim 4, wherein the means for generating comprises a pulse generator with a semiconductor, the timer having an output to the generator through a capacitor, said output further communicating with a diode and associated resistors in parallel, the generator having an input through a pair of capacitors, which coact with the semiconductor to produce the rectangular pulse having a predetermined duration.

6. The apparatus of claim 5, the generator connected through a resistor to an output to an NPN semiconductor and to an NPN transistor, the NPN semiconductor having follower resistors that provide sufficient current to drive the NPN transistor, wherein a high current source is provided through a conductor having a protective current limiting resistor to the collector of the NPN transistor, whereby a final, predetermined pulsed output at an emitter of the NPN transistor is directed through an interconnecting wire to the engine block.

7. The apparatus of claim 6, wherein the transistor emitter provides the predetermined pulsed output of 20 ampere rectangular pulse.

8. The apparatus of claim 6, wherein the timer means provides the rectangular pulse with the predetermined duration of 80 milliseconds.

9. The apparatus of claim 6, wherein the pulse is applied repetitively at a predetermined pulse repetition rate of five seconds.

10. The apparatus of claim 6, wherein the vehicle engine comprises a block with first and second sides, the apparatus further comprising a large gauge red wire for interconnecting the apparatus to the positive battery post; a smaller gauge black wire connecting the positive battery post to the frame; a green lead that connects the apparatus to the battery through the ignition; a large black lead that connects the apparatus to the first engine block side; and, a battery cable that connects the negative battery post to the second engine block side, whereby the apparatus is designed to be retrofitted onto a standard automotile having a conventional internal combustion engine.

11. A method for using an apparatus for demagnetizing an automotive engine block in a vehicle having a battery with positive and negative battery posts, a vehicular frame providing a frame connection point, an ignition switch to start the engine operation, the apparatus comprising a large gauge red wire, a smaller gauge black wire, a green lead, a large black lead, and a battery cable, comprising the steps of:

connecting the battery cable from the negative battery post terminal to the engine block;

attaching a large black lead from the apparatus to the opposite end of the engine block;

attaching the apparatus large red lead to the positive battery post of the vehicle;

attaching the apparatus green lead to an ignition switch, such that the apparatus will only operate when the vehicle's ignition is turned on; and, connecting the apparatus small black lead to the vehicle frame connection point, whereby the current flow is directed through the engine block.

12. A method for demagnetizing a standard internal combustion engine block of a vehicle having a battery with positive and negative posts, an ignition to start the engine, and a frame, by use of a retrofitted apparatus that includes an input connected to the battery positive post through the ignition; an apparatus output connected to one side of the engine; a cable for connection between an opposite side of the engine to the battery negative post and further to the vehicle frame; and, a means for generating a rectangular current pulse communicating with the input for output by the apparatus, comprising the steps of:

starting the vehicle with the ignition to simultaneously energize the apparatus;

generating a current pulse in the retrofitted demagnetizing apparatus;

directing the rectangular current pulse through the engine while it is in operation to deperm the engine by reversals, whereby the engine is demagnetized by successive rectangular current pulses therethrough for improved engine performance and efficiency.

* * * * *